United States Patent
Dandekar et al.

(10) Patent No.: US 8,386,761 B2
(45) Date of Patent: *Feb. 26, 2013

(54) SYSTEM FOR REGISTERING AND INITIATING PRE-BOOT ENVIRONMENT FOR ENABLING PARTITIONS

(75) Inventors: Shree A. Dandekar, Round Rock, TX (US); Alan E. Beelitz, Leander, TX (US); Richard C. Lawrence, Pflugerville, TX (US); Paul J. Maia, Cedar Park, TX (US); Michael K. Padilla, Round Rock, TX (US); Alok Pant, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 490 days.

This patent is subject to a terminal disclaimer.

(21) Appl. No.: 12/732,782

(22) Filed: Mar. 26, 2010

(65) Prior Publication Data

US 2010/0180109 A1     Jul. 15, 2010

Related U.S. Application Data

(63) Continuation of application No. 11/559,937, filed on Nov. 15, 2006, now Pat. No. 7,694,124.

(51) Int. Cl.
*G06F 9/00* (2006.01)
(52) U.S. Cl. .................... 713/2; 713/1
(58) Field of Classification Search .............. 713/1, 2, 713/100
See application file for complete search history.

(56) References Cited

U.S. PATENT DOCUMENTS

| 6,178,503 | B1 | 1/2001 | Madden et al. |
| 7,694,124 | B2 * | 4/2010 | Dandekar et al. ............ 713/2 |
| 2005/0216722 | A1 | 9/2005 | Kim et al. |
| 2006/0149956 | A1 | 7/2006 | Chang |
| 2007/0011200 | A1 | 1/2007 | Park |

* cited by examiner

*Primary Examiner* — Paul Yanchus, III
(74) *Attorney, Agent, or Firm* — Hamilon & Terrile, LLP; Stephen A. Terrile

(57) ABSTRACT

A method for registering and initiating a pre-boot environment for enabling partitions. The method provides a basic input output system (CIOS) with an application program interface (API) that accesses a Logical Clock Address (LCA) sector number when a boot configuration flag is set, the LCA sector number stores an operating environment manager which then boots the information handling system to an appropriate partition.

18 Claims, 3 Drawing Sheets

SYSTEM FOR REGISTERING AND INITIATING PRE-BOOT ENVIRONMENT FOR ENABLING PARTITIONS

This application is a continuation application of application Ser. No. 11/559,937, filed Nov. 15, 2006, now U.S. Pat. No. 7,694,124, issued Apr. 6, 2010, which is incorporated herein by reference in its entirety.

BACKGROUND OF THE INVENTION

1. Field of the Invention

The present invention relates to the field of registering and initiating pre-boot environments and more particularly to registering and initiating pre-boot environments in a Windows Vista type operating system for enabling partitions.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is known to provide information handling systems with a plurality of partitions. For example, it is known to provide MediaDirect and System Restore (PC Restore) solutions. These solutions are designed to boot into their respective partitions using some form of dynamic modifications done to a master boot record (MBR) every time a customer tries to boot into one of these partitions.

For example, FIG. 1, labeled prior art, shows an example implementation of booting into a MediaDirect partition for an XP type operating system. More specifically, FIG. 1 shows an example of booting into a MediaDirect partition from either a sleeping state (S4) or a soft-off state (S5) of an advanced Configuration and Power Interface (ACPI) compliant information handling system.

When a user actuates a MediaDirect button located on the information hanlding system from either the S4 or S5 state, the basic input output system (BIOS) of the information handling system sets a Simple Boot Flag (which may be stored within the configuration memory (e.g., the CMOS memory) of the information handling system) indicating the information handling system was powered on by the MediaDirect button. The information handling system boots to the hard drive, which is initiated by execution of the MBR boot code. The updated MBR boot code detects the Simple Boot Flag in the configuration memory and executes (i.e., jumps to) an Extended MBR Boot Code residing in unused sectors on track 0 of hard drive 0. The jump to command is executed from a bootstrap section of MBR. The Extended MBR Boot Code, using the MediaDirect MBR stored in track 0, unlocks the MediaDirect partition and boots to this partition. Thus, a MediaDirect installer program modifies the Master Boot Record (MBR). The MBR is modified so that the operating system on the MediaDirect partition is booted when the user starts the system by pressing the media button.

There are a plurality of issues relating to the use of this mechanism, especially with respect to a Windows Vista type operating system. For example, a Windows Vista type operating system may prohibit any custom version of the Master Boot Record. Therefore, if this were the case, a MediaDirect installer would be unable to modify the MBR on systems with Windows Vista. If the operating system is one that prohibits custom versions of the Master Boot Record, then it is desirable to provide an alternate mechanism to continue enabling booting to MediaDirect and System Restore partitions stored on the information handing system.

Additionally, MBR modifications may account for potential quality issues. It is often the case that errors in the execution of a PC Restore partition are due to MBR related issues. Additionally, MBR modifications can also cause booting difficulty (e.g., blue screen issues) with certain information handling systems.

Accordingly, it is desirable to provide a method for registering and initiating a pre-boot environment for enabling partitions.

SUMMARY OF THE INVENTION

In accordance with the present invention, a method for registering and initiating a pre-boot environment for enabling partitions is set forth. The method provides a BIOS with an application program interface (API) that accesses a Logical Block Address (LBA) sector number when a boot configuration flag is set, the LBA sector number stores an operating environment manager which then boots the information handling system to an appropriate partition.

The operating environment manager may be called either during the manufacturing process or in the field by the API of the BIOS to provide the BIOS with the LBA sector number which is stored within a boot drive. In certain embodiments, the LBA sector number includes a 64-bit LBA address which is stored within the BIOS.

The operating environment manager code is stored within predetermined sectors of the boot drive during manufacture or field service of the information handling system. In certain embodiments, the first sector (assuming more than one, but not necessarily) binary also includes the LBA address so that operating environment manager code can locate additional sectors that contain the continuation of the operating environment manager code (again, assuming more than one sector is required to store the operating environment code).

When customer actuates a button such as the MediaDirect button, BIOS detects that a MediaDirect mode is desired. The BIOS then reads the LBA address that was previously stored and, if set, reads that sector into memory. The BIOS may either separately maintain a flag that indicates MediaDirect/No-MediaDirect, or use the LBA address value itself as the flag. E.g., if 0 is not a valid LBA address, then 0 would indicate MediaDirect off.

Next, the BIOS verifies that the sector loaded into memory contains an operating environment manager signature. If no operating environment manager signature is present, then the BIOS boots to a customer operating system MBR as normal (i.e., the BIOS ignores the MediaDirect event). If an operating environment manager signature is present, then the BIOS jumps to the operating environment manager code (i.e., the BIOS causes the operating environment manager code to start executing).

The operating environment manager code takes over control of the information handling system and loads the MediaDirect Partition. This method allows an information handling system manufacturer to change boot code on the fly without having to synchronize changes to the boot code with BIOS release schedules. Additionally, this method also allows for the operating environment manager code to be stored anywhere on the drive of the information handling system (e.g., somewhere other than Track 0, if that truly became as issue with certain operating systems). Additionally, this method allows placement of the operating environment manager code in reserved sectors inside an actual MediaDirect partition, thus making the MediaDirect solution self contained.

Additionally, this method functions with a standard MBR, where a call to the operating environment manager (via e.g., the API) is added to the BIOS of information handling systems that support MediaDirect. Additionally, updates to the operating environment manager would not require BIOS updates

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
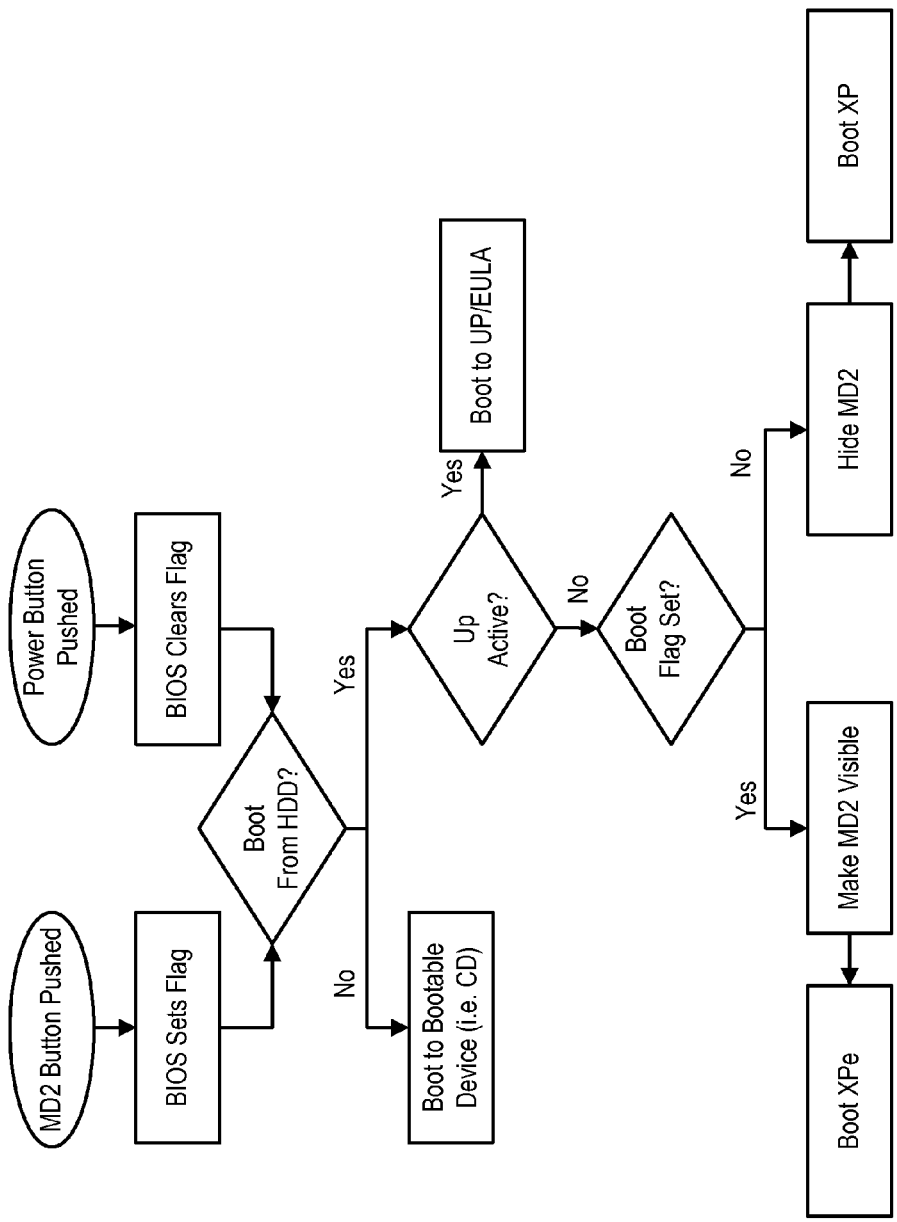
FIG. 1, labeled prior art, shows a flow chart of the operation of a method for accessing a MediaDirect partition using a custom MBR.
Figure 2:
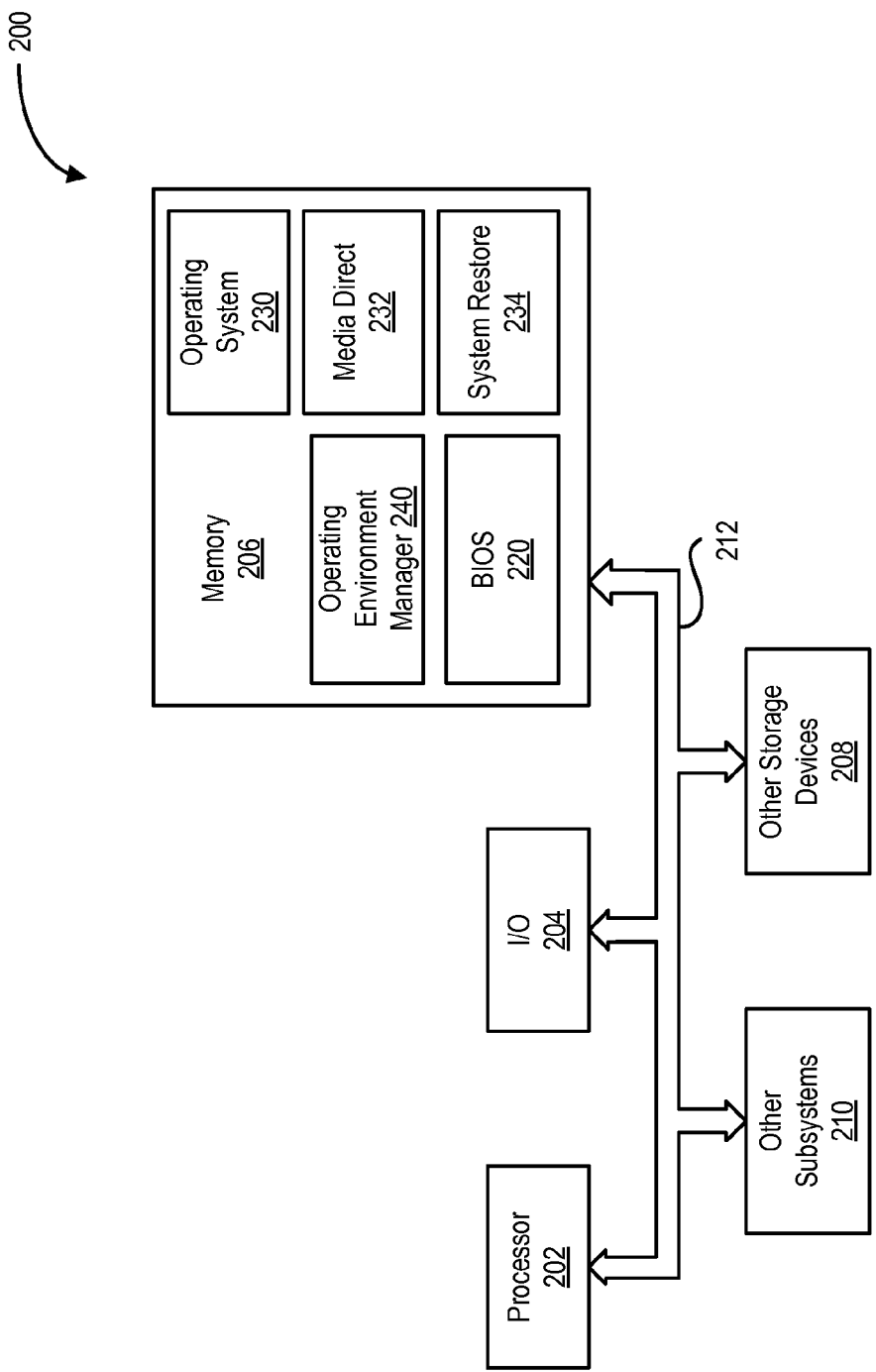
FIG. 2 shows a system block diagram of an information handling system.

Referring briefly to FIG. 2, a system block diagram of an information handling system 200 is shown. The information handling system 200 includes a processor 202, input/output (I/O) devices 204, such as a display, a keyboard, a mouse, and associated controllers, memory 206 including volatile memory such as random access memory and non volatile memory such as a hard disk and drive, and other storage devices 206, such as an optical disk and drive and other memory devices, and various other subsystems 210, all interconnected via one or more buses 212.

The information handling system 200 also includes a basic input output system (BIOS) 220 stored on the memory 206 as well as an operating system partition 230, a MediaDirect partition 232 and a system restore partition 234. The information handling system 200 also includes an operating environment manager 240 stored on the memory 206.

The operating environment manager 240 may be called either during the manufacturing process or in the field by the API of the BIOS 220 to provide the BIOS 220 with the LBA sector number which is stored within a boot drive. In certain embodiments, the LBA sector number includes a 64-bit LBA address which is stored within the BIOS 220.

The operating environment manager 240 is stored within predetermined sectors of a boot drive during manufacture or field service of the information handling system 200. In certain embodiments, the first sector (assuming more than one, but not necessarily) binary also includes the LBA address so that operating environment manager 240 can locate additional sectors that contain the continuation of the operating environment manager 240 (again, assuming more than one sector is required to store the operating environment code).

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 3:
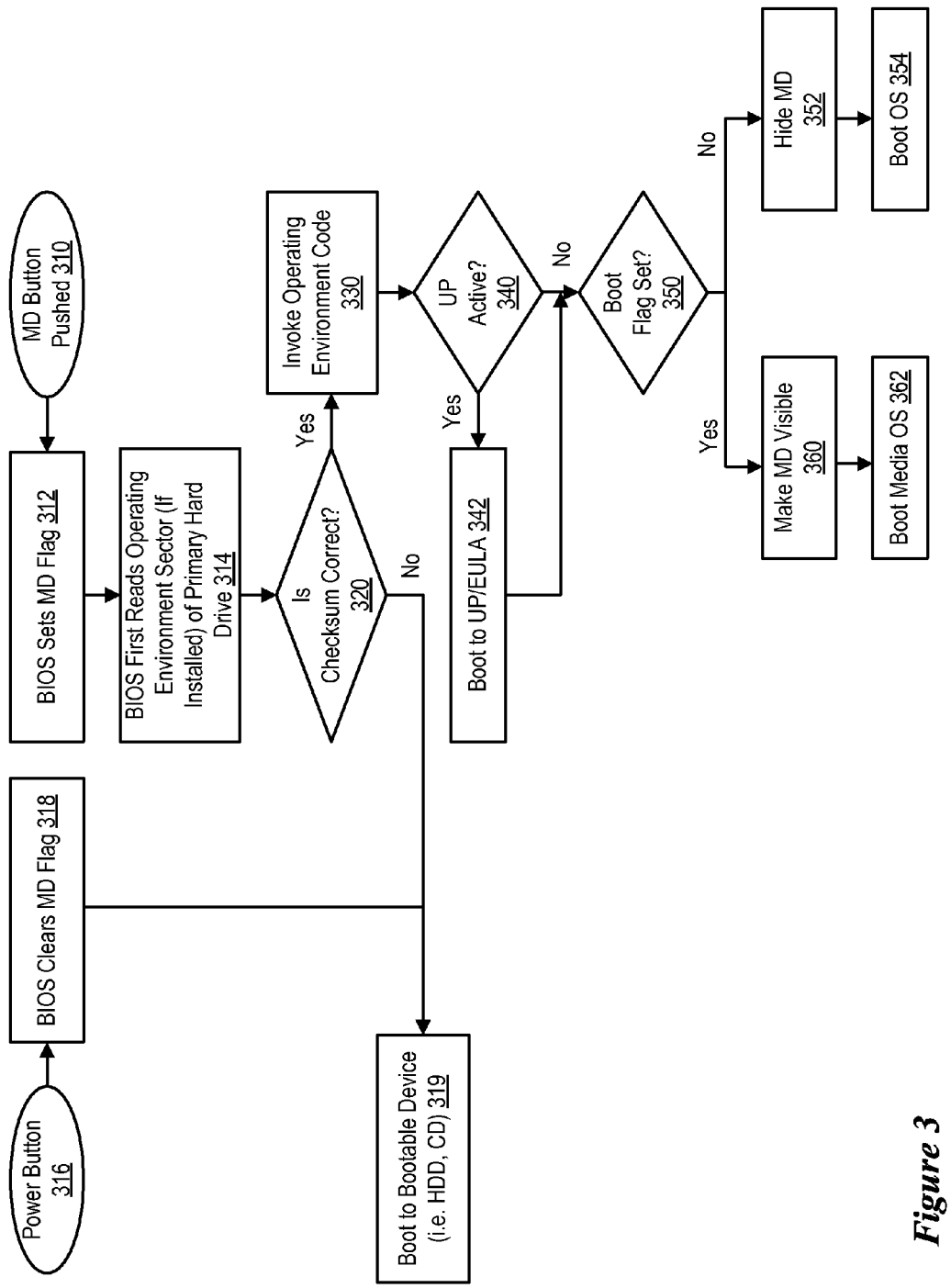
FIG. 3 shows a flow chart of the operation of a method for accessing a MediaDirect partition via an operating environment manager.

FIG. 3 shows a flow chart of the operation of a method for accessing a MediaDirect partition via an operating environment manage 240. More specifically, when a customer actuates a button such as a MediaDirect button at step 310, BIOS 220 detects that a MediaDirect mode is desired and sets a media direct (MD) flag (e.g., within the CMOS) so indicating at step 312. The BIOS 220 then reads an LBA address that was previously stored and, if set, reads that sector into memory at step 314. The BIOS may either separately maintain a flag that indicates MediaDirect/No-MediaDirect, or use the LBA address value itself as the flag. E.g., if 0 is not a valid LBA address, then 0 would indicate MediaDirect off When a customer actuates a power button at step 316, then the BIOS 220 clears the MD flag at step 318 and proceeds to boot to the bootable device, which in this case is the operating system partition 230, at step 319.

Next, the BIOS verifies that the sector loaded into memory contains an operating environment manager checksum at step 320. If no operating environment manager checksum is present, then the BIOS 220 boots to a customer operating system MBR as normal (i.e., the BIOS ignores the MediaDirect event) at step 319. If an operating environment manager checksum is present, then the BIOS invokes the operating environment manager 240 (i.e., the BIOS 220 causes the operating environment manager code to start executing) at step 330.

The operating environment manager 240 takes over control of the information handling system 200 and loads the MediaDirect Partition. More specifically, the operating environment manager 240 first determines whether a utility partition (UP) flag is active (indicating that system should boot to a license agreement portion) at step 340. If the utility partition is active, then the operating environment manger boots to a utility partition/end user license agreement (UP/EULA) portion at step 342.

If the UP flag is not active, then the operating environment manager 240 determines whether a media direct boot flag is set at step 350. If the media direct boot flag is not set, then the media direct partition is hidden at step 352 and the operating environment manger 240 boots to the primary operating system stored within the operating system partition 230 (e.g., the XP operating system) at step 354. If the media direct boot flag is set, then access to the media direct partition 232 is allowed (i.e., the media direct partition 232 is made visible) at step 360 and the information handling system 200 boots to the media operating system (e.g., the XPe operating system) stored within the media direct partition 232 at step 362.

This method allows an information handling system manufacturer to change boot code on the fly without having to synchronize changes to the boot code with BIOS release schedules. Additionally, this method also allows for the operating environment manager code to be stored anywhere on the drive of the information handling system (e.g., somewhere other than Track 0, if that truly became as issue with certain operating systems). Additionally, this method allows placement of the operating environment manager code in reserved sectors inside an actual MediaDirect partition, thus making the MediaDirect solution self contained.

Additionally, this method functions with a standard MBR, where a call to the operating environment manager (via e.g., the API) is added to the BIOS of information handling systems that support MediaDirect. Additionally, updates to the operating environment manager would not require BIOS updates The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Also for example, the operating environment manager may be stored as an operating environment manager module within the BIOS 220. In this embodiment, when the BIOS 220 detects actuation of the MediaDirect button, the BIOS 220 executes the operating environment manager module stored within the BIOS to boot to the MediaDirect partition. The operating environment manager module would virtualize a master boot record in memory so as to not effect the master boot record that is stored on the hard drive (e.g., stored at track 0/sector 1). The operating environment manager would know where the MediaDirect MBR (as well as all associated MediaDirect logic) is stored (e.g., at track 0/sector 3). Such a method would thus operate much like the master boot record method used by the Microsoft operating systems. However, updates to the operating environment manager module would need to be distributed across all of the different instantiations of the BIOS used across every system produced by an information handling system manufacturer. Additionally, with this method drive replacements in the field would need a fixer tool to restore the MediaDirect MBR to track 0/sector 3.

Also for example, the operating environment manager could be stored in a non-volatile memory portion (e.g., a non-volatile random access memory) within the BIOS 220. With this method, the BIOS could be updated with a call which loads operating environment manager out of NVRAM and jump to the operating environment manager when the MediaDirect button is actuated. The operating environment manager could be stored in the NVRAM during a factory install process when the information handling system is fabricated. Such a method would thus operate much like the master boot record method used by the Microsoft operating systems. Additionally, only the loader call needs to be added to the various instantiations of the BIOS used by the information handling system manufacturer, which is a smaller BIOS code change. Additionally, updates to the operating environment manager would not require BIOS updates. However, such a method would require a BIOS to include a writable portion.

Consequently, the invention is intended to be limited only by the spirit and scope of the appended claims, giving full cognizance to equivalents in all respects.

What is claimed is:

1. A method for initiating a pre-boot environment for an information handling system having an operating system portion and a media portion, the method comprising:
    providing an operating environment manager stored on a predetermined location of a boot drive of the information handling system;
    reading a location of the operating environment manager when a media mode of operation is indicated;
    accessing the location of the operating environment manager when the media mode of operation is indicated, the accessing being via the location read; and,
    booting to the media portion of the information handling system via the operating environment manager; and wherein
    accessing the location of the operating environment manager further comprises accessing a Logical Block Address (LBA) sector number when a boot configuration flag is set,
    the LBA sector number stores the operating environment manager which then boots the information handling system to an appropriate partition.

2. The method of claim 1 further comprising:
    upon accessing the location of the operating environment manager, verifying that an operating environment manager signature is present;
    booting to the operating system portion if the operating environment signature is not present; and
    executing the operating environment manager if the signature is present.

3. The method of claim 1 further comprising:
    determining whether an operating environment manager signature corresponds to an expected value;

booting to the operating system portion if the operating environment signature does not correspond to the expected value; and executing the operating environment manager if the signature corresponds to the expected value.

4. The method of claim 1 wherein:
the predetermined location is a predetermined sector of a primary hard drive of the information handling system.

5. The method of claim 1 wherein:
the operating system portion comprises an operating system partition; and,
the media portion comprises a media partition.

6. The method of claim 1 wherein:
the media portion comprises a MediaDirect mode of operation.

7. An apparatus for initiating a pre-boot environment for an information handling system having an operating system portion and a media portion, the apparatus comprising:
means for providing an operating environment manager stored on a predetermined location of a boot drive of the information handling system;
means for reading a location of the operating environment manager when a media mode of operation is indicated;
means for accessing the location of the operating environment manager when the media mode of operation is indicated, the accessing being via the location read; and,
means for booting to the media portion of the information handling system via the operating environment manager; and wherein
accessing the location of the operating environment manager further comprises accessing a Logical Block Address (LBA) sector number when a boot configuration flag is set,
the LBA sector number stores the operating environment manager which then boots the information handling system to an appropriate partition.

8. The apparatus of claim 7 further comprising:
means for verifying that an operating environment manager signature is present upon accessing the location of the operating environment manager;
means for booting to the operating system portion if the operating environment signature is not present; and
means for executing the operating environment manager if the signature is present.

9. The apparatus of claim 7 further comprising:
determining whether an operating environment manager signature corresponds to an expected value;
means for booting to the operating system portion if the operating environment signature does not correspond to the expected value; and
means for executing the operating environment manager if the signature corresponds to the expected value.

10. The apparatus of claim 7 wherein:
the predetermined location is a predetermined sector of a primary hard drive of the information handling system.

11. The apparatus of claim 7 wherein:
the operating system portion comprises an operating system partition; and,
the media portion comprises a media partition.

12. The apparatus of claim 7 wherein:
the media portion comprises a MediaDirect mode of operation.

13. An information handling system comprising:
a processor;
memory coupled to the processor, the memory comprising an operating system portion and a media portion, the memory comprising instructions for
providing an operating environment manager stored on a predetermined location of a boot drive of the information handling system;
reading a location of the operating environment manager when a media mode of operation is indicated;
accessing the location of the operating environment manager when the media mode of operation is indicated, the accessing being via the location read; and,
booting to the media portion of the information handling system via the operating environment manager; and wherein
accessing the location of the operating environment manager further comprises accessing a Logical Block Address (LBA) sector number when a boot configuration flag is set,
the LBA sector number stores the operating environment manager which then boots the information handling system to an appropriate partition.

14. The information handling system of claim 13 wherein the memory further stores instructions for:
verifying that an operating environment manager signature is present upon accessing the location of the operating environment manager;
booting to the operating system portion if the operating environment signature is not present; and
executing the operating environment manager if the signature is present.

15. The information handling system of claim 13 wherein the memory further stores instructions for:
determining whether an operating environment manager signature corresponds to an expected value;
booting to the operating system portion if the operating environment signature does not correspond to the expected value; and
executing the operating environment manager if the signature corresponds to the expected value.

16. The information handling system of claim 13 further comprising:
a primary hard drive; and wherein,
the predetermined location is a predetermined sector of the primary hard drive.

17. The information handling system of claim 13 wherein:
the operating system portion comprises an operating system partition; and,
the media portion comprises a media partition.

18. The information handling system of claim 13 wherein:
the media portion comprises a MediaDirect mode of operation.

* * * * *